(12) United States Patent
Campillo

(10) Patent No.: US 7,672,598 B1
(45) Date of Patent: Mar. 2, 2010

(54) CARRIER SIGNAL SUPPRESSION AND EXTRACTION SYSTEM

(75) Inventor: Anthony L Campillo, Springfield, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 419 days.

(21) Appl. No.: 11/752,580

(22) Filed: May 23, 2007

Related U.S. Application Data

(60) Provisional application No. 60/809,990, filed on May 24, 2006.

(51) Int. Cl.
*H04B 10/04* (2006.01)
*H04J 14/06* (2006.01)

(52) U.S. Cl. .................... 398/184; 398/65; 398/183; 398/201

(58) Field of Classification Search .............. 398/65, 398/183, 184, 201
See application file for complete search history.

(56) References Cited

U.S. PATENT DOCUMENTS

2007/0086788 A1* 4/2007 Monteiro et al. ............ 398/186

* cited by examiner

*Primary Examiner*—Leslie Pascal
(74) *Attorney, Agent, or Firm*—John J. Karasek; L. George Legg

(57) ABSTRACT

A carrier signal extraction system for suppressing and extracting a carrier signal component and transmitting a double sideband component includes a polarized light source for transmitting a polarized light signal output; a polarization modulator with a first input coupled to the polarized light signal output and a second input for adding a modulation signal to the polarized light signal, thereby generating a polarization modulated light output; and a polarizing element having an input coupled to the polarization modulated light output for suppressing and extracting the carrier signal component and preferentially transmitting a double sideband component of the polarization modulated light output.

17 Claims, 5 Drawing Sheets

CARRIER SIGNAL SUPPRESSION AND EXTRACTION SYSTEM

CROSS-REFERENCE TO RELATED APPLICATIONS

This Application is a Non-Prov of Prov (35 USC 119(e)) application 60/809,990 filed on May 24, 2006, incorporated herein by reference.

FIELD OF THE INVENTION

The invention relates in general to a modulated signal processing system. More specifically, the invention relates to a modulated signal processing system for extracting the carrier from a double-sideband polarization modulated signal.

BACKGROUND OF THE INVENTION

The frequency spectrum of a double-sideband modulated signal consists of a carrier at a given frequency ($f_o$), and higher and lower frequency sidebands separated from the carrier by integer multiples of the modulation frequency ($f_0+f_{mod}$, $f_0-f_{mod}$, $f_0+2f_{mod}$, $f_0-2f_{mod}$, etc.). The amount of power contained in these sidebands relative to the carrier is determined by the amplitude of modulation relative to the total power, or modulation depth. In analog systems, the modulation depth is kept small to minimize nonlinearities produced by nonlinear transfer functions in the modulator or receiver. This results in a spectrum with most of the optical power residing in the carrier. In systems that cannot tolerate large optical intensities, it is sometimes advantageous to suppress the large carrier component and amplify the information bearing sidebands for transmission.

In one approach, such as is described in R. Montgomery and R. DeSalvo, "A novel technique for double sideband suppressed carrier modulation of optical fields," *IEEE Photon. Tech. Lett.*, Vol. 7, no. 4, pp. 434-436 (1995) ("Montgomery et al."), the suppression of the optical carrier in single channel fiber optic links is attempted where the carrier is removed at the transmitter and a new carrier is injected at the receiver. This approach has also been explored as a method of increasing gain in single octave microwave photonic links.

Another carrier suppression technique is removing the carrier with a band-pass filter, e.g. as described in R. D. Esman. K. J. Williams. "Wideband Efficiency Improvement of Fiber Optic Systems by Carrier Subtraction." *IEEE Photon. Technol. Lett.*, Vol. 7, no. 2, pp. 218-220 (1995), and M. J. LaGasse. W. Charczenko, M. C. Hamilton, and S. Thaniyavarn, "Optical carrier filtering for high dynamic range fibre optic links," *Electron. Lett.*, Vol. 30, no. 25, pp. 2157-2158 (1994), and using a low biased Mach-Zehnder modulator, such as is described in Montgomery et al. These two techniques are limited in that they are inherently single carrier implementations. Additionally, removing the carrier with a band-pass filter requires a stable carrier wavelength. Furthermore, the band-pass filter will remove the sidebands at low frequencies, limiting its use for lower frequency modulations. Exploiting stimulated Brillouin scattering (SBS) to remove the carrier has also been demonstrated, e.g. as described in K. J. Williams, R. D. Esman, "Stimulated Brillouin scattering for improvement of microwave fibre-optic link efficiency." *Electron. Lett.*, Vol. 30, no. 23, pp. 1965-1966 (1994) and in S. Tonda-Goldstein, S. Norcia, D. Dolfi and J.-P. Huignard, "40 dB dynamic enhancement of modulation depth for optically carried microwave signals." *Electron. Lett.*, Vol. 39, no. 10, pp. 790-792 (2003). This technique requires high initial optical powers and the Brillouin scattering will result in a Doppler shift of the carriers, eliminating the ability to re-inject the carriers in a coherent system.

It would be desirable to provide a system capable of suppressing the large carrier component and amplifying the information bearing sidebands for transmission without these limitations.

BRIEF SUMMARY OF THE INVENTION

According to the invention, a carrier signal extraction system for suppressing and extracting a carrier signal component and transmitting a double sideband component includes a polarized light source for transmitting a polarized light signal output; a polarization modulator with a first input coupled to the polarized light signal output and a second input for adding a modulation signal to the polarized light signal, thereby generating a polarization modulated light output; and a polarizing element having an input coupled to the polarization modulated light output for suppressing and extracting the carrier signal component and preferentially transmitting a double sideband component of the polarization modulated light output.

Also according to the invention, a multiplexed-type of this system includes a plurality of the polarized light sources; a multiplexer with a plurality of inputs each coupled to a corresponding polarized light signal output, and that has a common output for the multi-channel polarized light output signal; a polarization modulator with one input coupled to the common multiplexer output and a second input for adding the modulation signal to the multi-channel polarized light signal, thereby producing a multi-channel polarization modulated light output; and a polarizing element, with its input coupled to the multi-channel output signal, that suppresses and extracts the carrier signal component and transmits the double sideband component of each of the polarization modulated light outputs.

The invention thus provides suppressed-carrier double-sideband modulation by using a polarizer to suppress or a polarizing beam splitter to extract the carrier from a double-sideband polarization modulated signal. Because this technique is independent of the carrier frequency, it can be used to simultaneously extract the carriers from several channels in a frequency or wavelength multiplexed system. The extracted carriers can be transmitted along a separate path and used for coherent detection.

The invention provides a simple technique for separating the carrier and sidebands from signals transmitted at multiple wavelengths. Because the carriers are extracted to a separate fiber, the carriers can be re-used as local oscillators in a coherent detection scheme. Applications of the system and method include antenna remoting, multi-channel microwave delay lines, and coherent communication over fiber or through free space.

Other advantages and features of the invention will become apparent from the following detailed description of the preferred embodiments and the accompanying drawings.

DETAILED DESCRIPTION OF THE INVENTION

Figure 1:
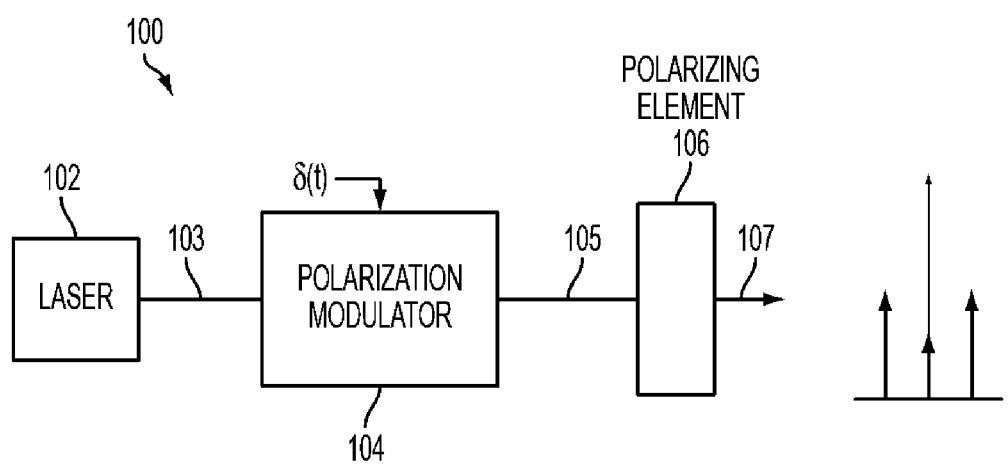
FIG. 1 is a schematic illustration of a suppressed carrier modulation system according to the invention.

Referring now to FIG. 1, a signal carrier suppression and extraction system 100 according to the invention includes a laser source 102 for outputting a laser light signal 103 to a polarization modulator 104, producing the electric field:

$$\vec{E} = A_0 \begin{bmatrix} \cos(\delta(t)) \\ \sin(\delta(t)) \end{bmatrix} \cos(\omega_0 t). \quad (1)$$

Or, written in Stokes space:

$$\vec{S} = A_0^2 (1, \cos(2\delta(t)), \sin(2\delta(t))0) \quad (1a)$$

where $\delta(t)$ is the modulation applied to the modulator and $\omega_0$ is the frequency of the optical carrier. For a modulation of $\delta(t) = m\sin(\Omega t)$, the Fourier expansion of this field gives:

$$\vec{E} = A_0 \left\{ \sum_{n=-\infty}^{\infty} J_{2n}(m)\cos((\omega_0 + 2n\Omega)t) \begin{bmatrix} 1 \\ 0 \end{bmatrix} + \sum_{n=-\infty}^{\infty} J_{2n+1}(m)\sin((\omega_0 + (2n+1)\Omega)t) \begin{bmatrix} 0 \\ 1 \end{bmatrix} \right\}. \quad (2)$$

Figure 2:
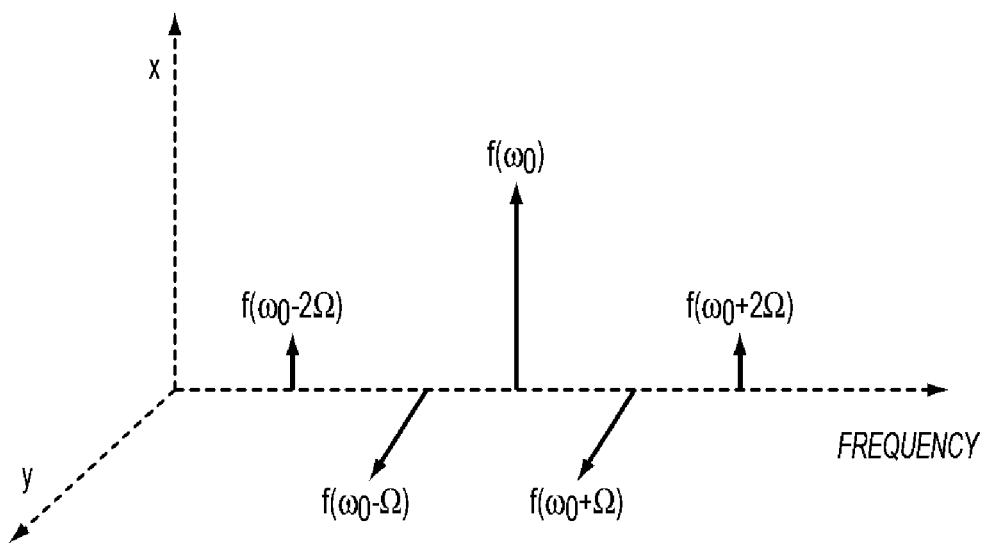
FIG. 2 is a graph showing an optical spectrum produced by polarization modulation.

This spectrum is illustrated in FIG. 2. The carrier and the frequency components of the output signal 105 of polarization modulator 104 at even harmonics of the modulation frequency have a polarization orthogonal to the frequency components at odd harmonics of the modulation frequency. Therefore, a polarizing element 106 is preferably employed to selectively filter the carrier while transmitting the first order sidebands, creating a carrier suppressed double sideband modulation signal as the output signal 107 of polarizing element 106. Although (2) was derived for the specific modulation in (1), any device which applies equal and opposite phase modulations to two orthogonal polarization components of an input electric field will produce the modulation needed for this technique, provided the input light is polarized such that it lies along the great circle of the Poincare sphere that is 90° away from the two orthogonal components. (Note that this is not constrained to linear polarization components, but could be implemented by applying modulations to orthogonal elliptical or circular polarization components. The modulation in (1) could be produced by applying equal and opposite phase modulations to the left and right circular polarization components of an input signal polarized at 0°) For example, the modulation [1,0, cos (2δ(t)), sin(2δ(t))], obtained if equal and opposite phase modulations are applied to the x and y linear polarization components of an input signal polarized at 45° will have a carrier and fundamental sidebands with polarizations of +45° and −45°, respectively.

Figure 3:
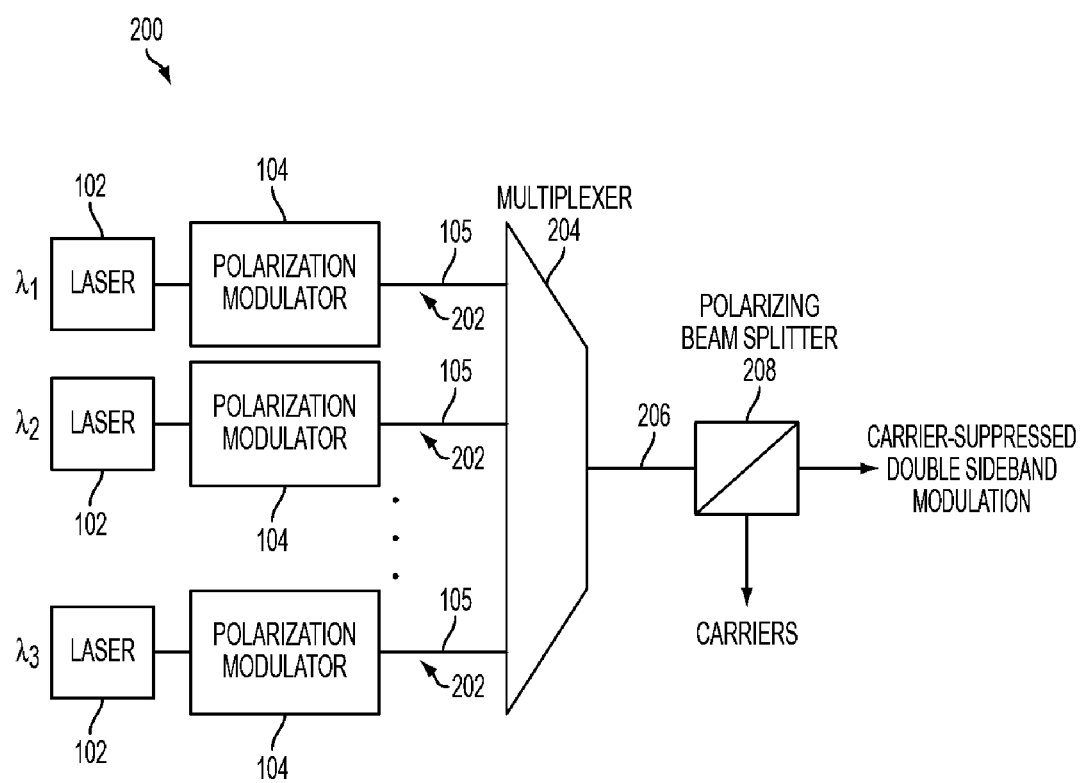
FIG. 3 is a schematic illustration of a multi-channel suppressed carrier modulation system according to the invention.

FIG. 3 shows one implementation of this technique for a multi-channel wavelength division multiplexed system 200 employing 1 to n signal inputs. Each laser 102 operates at a different wavelength. Each wavelength is modulated using a polarization modulator 104 biased so that the carrier is aligned with one axis of a polarization maintaining fiber 202. The signal outputs 105 of different wavelengths on channels 1 to n are then multiplexed with a polarization maintaining multiplexer 204 onto a common fiber 206. A polarizing beam splitter 208 is then used to simultaneously remove (or suppress) all of the carriers.

Figure 4:
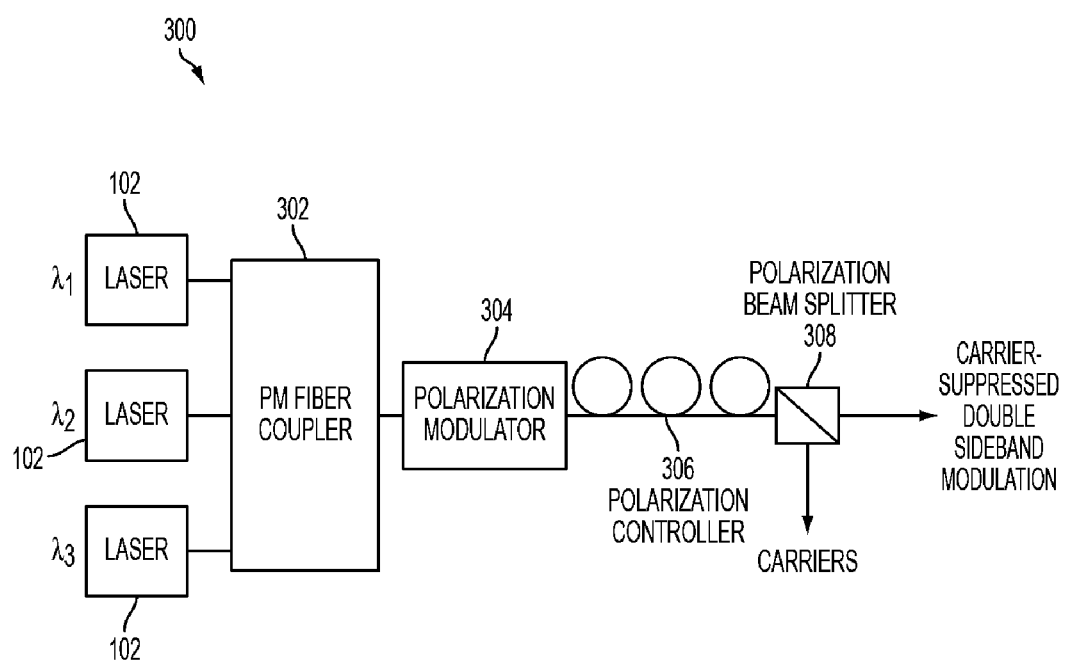
FIG. 4 is a schematic illustration of a multi-channel suppressed carrier modulation system according to the invention.
Figure 5A:
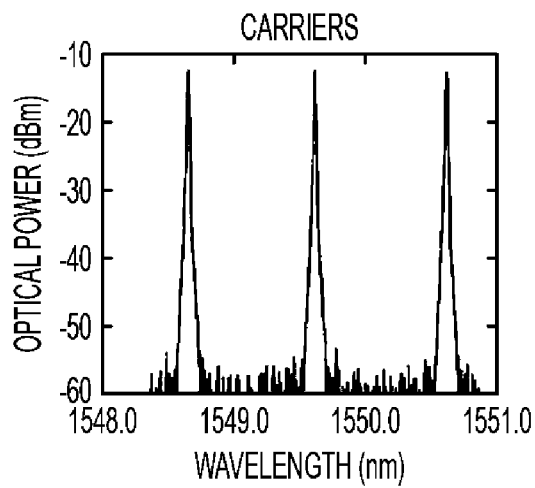
FIG. 5 is a graph showing the output of the system shown in FIG. 4.
Figure 5B:
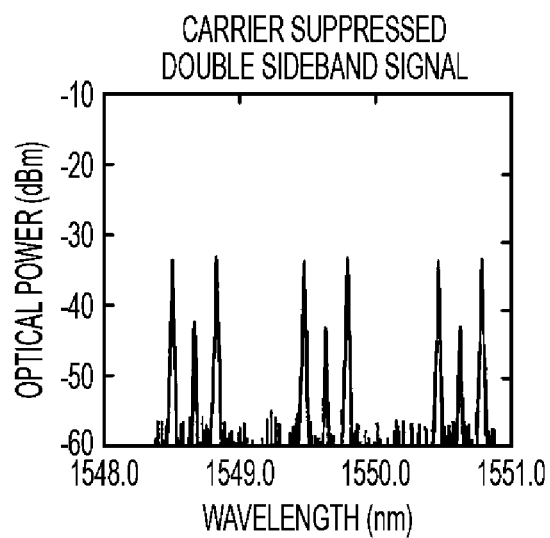

Another embodiment is illustrated in FIG. 4 for a system 300, where the outputs of three lasers 102 are combined using a polarization maintaining fiber coupler 302 and modulated with a polarization modulator 304. Using a polarization controller 306, the polarization of all three carriers is adjusted so that they are parallel to one axis of a polarizing beam splitter 308. The polarizing beam splitter 308 then separates the carriers from the sidebands. The spectrum for each output of the beam splitter is shown in FIG. 5.

The invention allows the carriers to be extracted or suppressed for channels at different wavelengths using a single device. Because all channels can be extracted simultaneously, they can be transmitted along a common fiber as frequency references for coherent systems. Unlike band-pass filter based systems, this technique is not degraded by wavelength variations of the source laser.

In the embodiments illustrated in the above Figures, optical fibers are used to transmit light between elements of this system. Alternatively, free space optics, integrated waveguides, or other transmission techniques could be used.

In a single channel system, the polarizing element can be attached directly to the output of the polarization modulator.

Single mode fibers combined with polarization controllers can be used in place of the polarization maintaining fiber 202.

Light Sources: As discussed above, laser sources 102 may be used in the practice of the invention. However, the invention further includes any polarized light source having a sufficiently narrow frequency spectrum. (The width of the frequency spectrum will widen the transmitted signal spectrum, therefore the width of the frequency that constitutes specifically narrow will be application dependent. For example, if a signal containing a modulation within the 2-4 GHz band will be transmitted through an optical filter with a bandwidth of 5 GHz, the light source should have frequency spectrum narrower than 2 GHz.).

Polarization modulator 104: An example of one such device useful in the invention is the JGKB EOM-40G/HB-1550/G modulator (JGKB photonics. Inc.). A current equivalent modulator is the Versawave EOM-PM-40G (Versawave, a division of JGKB photonics, Inc.), the operation of which is described in J. D. Bull, N. A. F. Jaeger, H. Kato, M. Fairburn A. Reid, P. Ghanipour, "40 GHz electro-optic polarization modulator for fiber optic communication systems." *Photonics North* 2004, Proc. of SPIE, vol. 5566, pp. 133-143 (2004).

Polarizing element 106: Any device that preferentially transmits one polarization component at its output can be interchangeably used as such in the practice of the invention. The magnitude of the carrier suppression will depend on the polarization extinction ratio of the device.

Also, in the above description, a polarizing beam splitter 208 (308) is employed. When the invention is practiced to extract the carrier, a device such as a polarizing beam splitter which has two outputs (as shown) that transmit orthogonal polarization components of the input light should be used.

Multiplexer 204: This may be any such device that can combine multiple optical inputs onto one output, e.g. a fused fiber coupler, a waveguide coupler, a thin film filter-based wavelength division multiplexer, a Bragg grating based wavelength division multiplexer, or an arrayed waveguide grating.

The invention has been described with reference to certain preferred embodiments thereof. It will be understood, however, that modification and variations are possible within the scope of the appended claims.

What is claimed as new and desired to be protected by Letters Patent of the United States is:

1. A carrier signal extraction system for suppressing and extracting a carrier signal component and transmitting a double sideband component, comprising:
    a polarized light source for transmitting a polarized light signal output;
    a polarization modulator with a first input coupled to the polarized light signal output and a second input for adding a modulation signal to the polarized light signal and thereby generating a polarization modulated light output; and
    a polarizing element having an input coupled to the polarization modulated light output for suppressing and extracting the carrier signal component and preferentially transmitting a double sideband component of the polarization modulated light output.

2. A signal extraction system as in claim 1, wherein the light source is a coherent light source.

3. A signal extraction system as in claim 1, wherein the modulation signal is selected form the group consisting of a binary digital signal, a multilevel digital signal, and an analog signal.

4. A signal extraction system as in claim 1, wherein the polarizing element is selected from the group consisting of a polarizer and a polarizing beam splitter.

5. A signal extraction system as in claim 1 wherein the polarizing element comprises a polarizing beam splitter having a first output for preferentially transmitting the double sideband component of the polarization modulated light output and a second output for preferentially transmitting the carrier signal component of the polarization modulated light output.

6. A multi-channel signal extraction system for suppressing and extracting a carrier signal component and transmitting a double sideband component, comprising:
    a plurality of polarized light sources each for transmitting a polarized light signal output;
    a plurality of polarization modulators each having a first input coupled to a corresponding polarized light signal output and a second input for adding a modulation signal to the polarized light signal and thereby generating a polarization modulated light output;
    a multiplexer having a plurality of inputs each of which is coupled to a corresponding polarization modulated light output for generating a multiplexed multi-channel output signal; and
    a polarizing element having an input coupled to the multi-channel output signal for suppressing and extracting the carrier signal component and preferentially transmitting a double sideband component of the polarization modulated light outputs.

7. A signal extraction system as in claim 6, wherein the light sources are coherent light sources.

8. A signal extraction system as in claim 6, wherein the multiplexer is a wavelength multiplexer selected from the group consisting of a fused fiber coupler, an integrated waveguide coupler, a beam combiner, an arrayed waveguide grating, a grating based combiner, and a concatenated series of optical filters.

9. A signal extraction system as in claim 6, wherein the modulation signals are selected from the group consisting of binary digital signals, multilevel digital signals, and analog signals.

10. A signal extraction system as in claim 6, wherein the polarizing element is selected from the group consisting of a polarizer and a polarizing beam splitter.

11. A signal extraction system as in claim 6, wherein the polarizing element comprises a polarizing beam splitter having a first output for preferentially transmitting the double sideband component of the polarization modulated light outputs and a second output for preferentially transmitting the carrier signal component of the polarization modulated light outputs.

12. A multi-channel signal extraction system for suppressing and extracting a carrier signal component and transmitting a double sideband component, comprising:
    a plurality of polarized light sources each for transmitting a polarized light signal output;
    a multiplexer having a plurality of inputs each of which is coupled to a corresponding polarized light signal output and having a common output for generating a multi-channel polarized light output signal;
    a polarization modulator with an input coupled to the multi-channel polarized light signal output and a second input for adding a modulation signal to the multi-channel polarized light signal and thereby generating a multi-channel polarization modulated light output; and
    a polarizing element having an input coupled to the multi-channel output signal for suppressing the carrier signal component and preferentially transmitting a double sideband component of the polarization modulated light outputs.

13. A signal extraction system as in claim 12, wherein the light sources are coherent light sources.

14. A signal extraction system as in claim 12, wherein the multiplexer is a wavelength multiplexer selected from the group consisting of a fused fiber coupler, an integrated waveguide coupler, a beam combiner, an arrayed waveguide grating, a grating based combiner, and a concatenated series of optical filters.

15. A signal extraction system as in claim 12, wherein the modulation signals are selected from the group consisting of binary digital signals, multilevel digital signals, and analog signals.

16. A signal extraction system as in claim 12, wherein the polarizing element is selected from the group consisting of a polarizer and a polarizing beam splitter.

17. A signal extraction system as in claim 12 wherein the polarizing element comprises a polarizing beam splitter having a first output for preferentially transmitting the double sideband component of the polarization modulated light outputs and a second output for preferentially transmitting the carrier signal component of the polarization modulated light outputs.

* * * * *